US00RE50934E

(19) United States
(12) Reissued Patent
Sjöberg et al.

(10) Patent Number: US RE50,934 E
(45) Date of Reissued Patent: *Jun. 23, 2026

(54) METHODS PROVIDING ENCODING AND/OR DECODING OF VIDEO USING A SYNTAX INDICATOR AND PICTURE HEADER

(71) Applicant: TELEFONAKTIEBOLAGET LM ERICSSON (PUBL), Stockholm (SE)

(72) Inventors: Rickard Sjöberg, Stockholm (SE); Martin Pettersson, Vallentuna (SE); Mitra Damghanian, Upplands-Bro (SE)

(73) Assignee: Telefonaktiebolaget LM Ericsson (publ), Stockholm (SE)

( * ) Notice: This patent is subject to a terminal disclaimer.

(21) Appl. No.: 19/234,526

(22) Filed: Jun. 11, 2025

Related U.S. Patent Documents

Reissue of:
(64) Patent No.: 11,677,957
Issued: Jun. 13, 2023
Appl. No.: 17/739,256
Filed: May 9, 2022

U.S. Applications:
(63) Continuation of application No. 18/615,173, filed on Mar. 25, 2024, now Pat. No. Re. 50,561, which is an (Continued)

(51) Int. Cl.
*H04N 19/132* (2014.01)
*H04N 19/169* (2014.01)

(Continued)

(52) U.S. Cl.
CPC ..... *H04N 19/132* (2014.11); *H04N 19/174* (2014.11); *H04N 19/188* (2014.11); *H04N 19/46* (2014.11); *H04N 19/70* (2014.11)

(58) Field of Classification Search
CPC .. H04N 19/132; H04N 19/174; H04N 19/188; H04N 19/46; H04N 19/70
See application file for complete search history.

(56) References Cited

U.S. PATENT DOCUMENTS 5,517,250 A * 5/1996 Hoogenboom ..... H04N 19/00 375/E7.277
2004/0218669 A1* 11/2004 Hannuksela ..... H04N 19/31 375/E7.279

(Continued)

FOREIGN PATENT DOCUMENTS

WO 2015101716 A1 7/2015
WO 2015101716 W 7/2015

OTHER PUBLICATIONS

C-Y Tsai et al: "CE4 Subset3: Slice Common Information Sharing", 5. JCT-VC Meeting; Mar. 16, 2011-Mar. 23, 2011; Geneva; (Joint Collaborative Team on Video Coding of ISO/IEC JTC1/SC29/WG11 and ITU-T SG.16 ), No. JCTVC-E045 Mar. 19, 2011 (Mar. 19, 2011), XP030227558.

(Continued)

*Primary Examiner* — Robert J Hance

(57) ABSTRACT

There are provided mechanisms for processing encoded image data. The method comprises receiving an encoded bitstream comprising parameter set information. The parameter set information may comprise a syntax indicator, a first coded portion comprising first coded sample information for a picture and a second coded portion comprising second coded sample information for the picture. The method further comprises, responsive to a first value of the syntax indicator, decoding the first coded sample information using a picture header syntax element from a picture header of the encoded bitstream. The method further comprises, responsive to the first value of the syntax indicator, decoding the second coded sample information using the picture header syntax element from the picture header of the encoded bitstream.

9 Claims, 12 Drawing Sheets

Related U.S. Application Data application for the reissue of Pat. No. 11,677,957, which is a continuation of application No. 16/640,908, filed as application No. PCT/SE2019/051260 on Dec. 10, 2019, now Pat. No. 11,356,667.

(60) Provisional application No. 62/782,998, filed on Dec. 20, 2018.

(51) Int. Cl.
*H04N 19/174* (2014.01)
*H04N 19/46* (2014.01)
*H04N 19/70* (2014.01)

(56) References Cited

U.S. PATENT DOCUMENTS

2005/0053158 A1* 3/2005 Regunathan ..... H04N 19/86 375/E7.199
2005/0281328 A1* 12/2005 Hurst, Jr. ..... H04N 21/44016 375/240
2006/0050793 A1* 3/2006 Wang ..... H04N 19/70 375/E7.199
2010/0027679 A1* 2/2010 Sunahara ..... H04N 19/70 375/240.24
2012/0207227 A1* 8/2012 Tsai ..... H04N 19/172 375/E7.194
2013/0208797 A1* 8/2013 Lu ..... H04N 19/423 375/E7.243
2013/0343465 A1 12/2013 Chen et al.
2014/0119445 A1* 5/2014 Tan ..... H04N 19/89 375/E7.23
2014/0161198 A1* 6/2014 Tan ..... H04N 19/895 375/240.27
2014/0369415 A1* 12/2014 Naing ..... H04N 19/70 375/240.16
2016/0381393 A1* 12/2016 Tsukuba ..... H04N 19/30 375/240.12
2017/0006300 A1* 1/2017 Tsukuba ..... H04N 19/44
2018/0041764 A1* 2/2018 Lin ..... H04N 5/23238

OTHER PUBLICATIONS

Hannuksela (Nokia) MM et al: "Header parameter set (HPS)"; 12. JVET Meeting; Oct. 3, 2018-Oct. 12, 2018;Macao; (The Joint Video Exploration Teamof ISO/IEC JTC1/SC29/WVG11 and ITU-T SG.16 ), No. JVET-L0183 Oct. 5, 2018 (Oct. 5, 2018), XP030194832.
R. Sjoberg et al. "Overview of HEVC High-Level Syntax and Reference Picture Management", IEEE Transactions on Circuits and Systems for Video Technology, Oct. 5, 2012, pp. 1-14, vol. 22, No. 12.
Sjoberg et al. "AGH17: Picture header NAL unit type", 13 JVET. Meeting, Jan. 12, 2019, No. JVET-M0377-v2.
Supplementary European Search Report, European Patent Application No. 19897887, dated Feb. 11, 2022, 6 pages.
Tsai, C-Y, et al., CE4 Subset3: Slice Common Information Sharing, Joint Collaborative Team on Video Coding (JCT-VC) of ITU-T SG 16 WP3 and ISO/IEC JTC1/SC29/WG11, 5th Meeting: Geneva, CH, Mar. 16-23, 2011, Document JCTVC-E045 (XP030227558) 7 pages.

* cited by examiner

| nal_unit( NumBytesInNalUnit ) { | Descriptor |
|---|---|
| nal_unit_header( ) | |
| NumBytesInRbsp = 0 | |
| for( i = 2; i < NumBytesInNalUnit; i++ ) | |
| if( i + 2 < NumBytesInNalUnit && next_bits( 24 ) == 0x000003 ) { | |
| rbsp_byte[ NumBytesInRbsp++ ] | b(8) |
| rbsp_byte[ NumBytesInRbsp++ ] | b(8) |
| i += 2 | |
| emulation_prevention_three_byte /* equal to 0x03 */ | f(8) |
| } else | |
| rbsp_byte[ NumBytesInRbsp++ ] | b(8) |
| } | |

FIG. 6

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

FIG. 7

| tile_group_layer_rbsp( ) { | Descriptor |
|---|---|
| tile_group_header( ) | |
| tile_group_data( ) | |
| rbsp_tile group_trailing_bits( ) | |
| } | |

FIG. 8

| tile_group_header( ) { | Descriptor |
|---|---|
| **tile_group_pic_parameter_set_id** | ue(v) |
| if( NumTilesInPic > 1 ) { | |
| **tile_group_address** | u(v) |
| **num_tiles_in_tile_group_minus1** | ue(v) |
| } | |
| **tile_group_type** | ue(v) |
| if ( tile_group_type != I ) { | |
| **log2_diff_ctu_max_bt_size** | ue(v) |
| if( sps_sbtmvp_enabled_flag ) { | |
| **sbtmvp_size_override_flag** | u(1) |
| if( sbtmvp_size_override_flag ) | |
| **log2_sbtmvp_active_size_minus2** | u(3) |
| } | |
| if( sps_temporal_mvp_enabled_flag ) | |
| **tile_group_temporal_mvp_enabled_flag** | u(1) |
| if( tile_group_type == B ) | |
| **mvd_l1_zero_flag** | u(1) |
| if( tile_group_temporal_mvp_enabled_flag ) { | |
| if( tile_group_type == B ) | |
| **collocated_from_l0_flag** | u(1) |
| } | |
| **six_minus_max_num_merge_cand** | ue(v) |
| } | |
| **dep_quant_enabled_flag** | u(1) |
| if( !dep_quant_enabled_flag ) | |
| **sign_data_hiding_enabled_flag** | u(1) |
| if( num_tiles_in_tile_group_minus1 > 0 ) { | |
| **offset_len_minus1** | ue(v) |
| for( i = 0; i < num_tiles_in_tile_group_minus1; i++ ) | |
| **entry_point_offset_minus1[ i ]** | u(v) |
| } | |
| byte_alignment( ) | |
| } | |

FIG. 9

| tile_group_data( ) { | Descriptor |
|---|---|
| tileIdx = tile_group_address | |
| for( i = 0; i <= num_tiles_in_tile_group_minus1; i++, tileIdx++ ) { | |
| ctbAddrInTs = FirstCtbAddrTs[ tileIdx ] | |
| for( j = 0; j < NumCtusInTile[ tileIdx ]; j++, ctbAddrInTs++ ) { | |
| CtbAddrInRs = CtbAddrTsToRs[ ctbAddrInTs ] | |
| coding_tree_unit( ) | |
| } | |
| **end_of_tile_one_bit** /* equal to 1 */ | ae(v) |
| if( i < num_tiles_in_tile_group_minus1 ) | |
| byte_alignment( ) | |
| } | |
| } | |

FIG. 10

| nal_unit_type | Name of nal_unit_type | Content of NAL unit and RBSP syntax structure | NAL unit type class |
|---|---|---|---|
| 0 | NON_IRAP_NUT | Coded tile group of a non-IRAP picture tile_group_layer_rbsp( ) | VCL |
| 1 | IRAP_NUT | Coded tile group of an IRAP picture tile_group_layer_rbsp( ) | VCL |
| 2-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22 | PIC_NUT | Picture header picture_header_rbsp() | non-VCL |
| 23-26 | RSV_NVCL | Reserved | non-VCL |
| 27-31 | UNSPEC | Unspecified | non-VCL |

FIG. 11

| picture_header_rbsp( ) { | Descriptor |
|---|---|
| **pic_header_pic_parameter_set_id** | ue(v) |
| common_tile_group_header() | |
| byte_alignment( ) | |
| } | |

FIG. 12

| seq_parameter_set_rbsp( ) { | Descriptor |
|---|---|
| ... | |
| **sps_picture_header_enabled_flag** | u(1) |
| ... | |
| } | |

FIG. 13

| tile_group_header( ) { | Descriptor |
|---|---|
| **tile_group_pic_parameter_set_id** | ue(v) |
| if( NumTilesInPic > 1 ) { | |
| **tile_group_address** | u(v) |
| **num_tiles_in_tile_group_minus1** | ue(v) |
| } | |
| if( !sps_picture_header_enabled_flag ) | |
| common_tile_group_header() | |
| if( num_tiles_in_tile_group_minus1 > 0 ) { | |
| **offset_len_minus1** | ue(v) |
| for( i = 0; i < num_tiles_in_tile_group_minus1; i++ ) | |
| **entry_point_offset_minus1**[ i ] | u(v) |
| } | |
| byte_alignment( ) | |
| } | |

FIG. 14

| ~~tile_group_header()~~ common_tile_group_header() { | Descriptor |
|---|---|
| ~~tile_group_pic_parameter_set_id~~ | ~~ue(v)~~ |
| ~~if( NumTilesInPic > 1 ) {~~ | |
| ~~tile_group_address~~ | ~~u(v)~~ |
| ~~num_tiles_in_tile_group_minus1~~ | ~~ue(v)~~ |
| ~~}~~ | |
| **poc_lsb** | u(v) |
| **tile_group_type** | ue(v) |
| if( tile_group_type != I ) { | |
| **log2_diff_ctu_max_bt_size** | ue(v) |
| if( sps_sbtmvp_enabled_flag ) { | |
| **sbtmvp_size_override_flag** | u(1) |
| if( sbtmvp_size_override_flag ) | |
| **log2_sbtmvp_active_size_minus2** | u(3) |
| } | |
| if( sps_temporal_mvp_enabled_flag ) | |
| **tile_group_temporal_mvp_enabled_flag** | u(1) |
| if( tile_group_type == B ) | |
| **mvd_l1_zero_flag** | u(1) |
| if( tile_group_temporal_mvp_enabled_flag ) { | |
| if( tile_group_type == B ) | |
| **collocated_from_l0_flag** | u(1) |
| } | |
| **six_minus_max_num_merge_cand** | ue(v) |
| } | |
| **dep_quant_enabled_flag** | u(1) |
| if( !dep_quant_enabled_flag ) | |
| **sign_data_hiding_enabled_flag** | u(1) |
| ~~if( num_tiles_in_tile_group_minus1 > 0 ) {~~ | |
| ~~offset_len_minus1~~ | ~~ue(v)~~ |
| ~~for( i = 0; i < num_tiles_in_tile_group_minus1; i++ )~~ | |
| ~~entry_point_offset_minus1[ i ]~~ | ~~u(v)~~ |
| ~~}~~ | |
| byte_alignment( ) | |
| } | |

FIG. 15

| tile_group_header( ) { | Descriptor |
|---|---|
| if( !sps_picture_header_enabled_flag ) | |
| **tile_group_pic_parameter_set_id** | ue(v) |
| if( NumTilesInPic > 1 ) { | |
| **tile_group_address** | u(v) |
| **num_tiles_in_tile_group_minus1** | ue(v) |
| } | |
| if( !sps_picture_header_enabled_flag ) | |
| common_tile_group_header() | |
| if( num_tiles_in_tile_group_minus1 > 0 ) { | |
| **offset_len_minus1** | ue(v) |
| for( i = 0; i < num_tiles_in_tile_group_minus1; i++ ) | |
| **entry_point_offset_minus1[ i ]** | u(v) |
| } | |
| if (!sps_picture_header_enabled_flag \|\| NumTilesInPic > 1 ) | |
| byte_alignment( ) | |
| } | |

FIG. 16

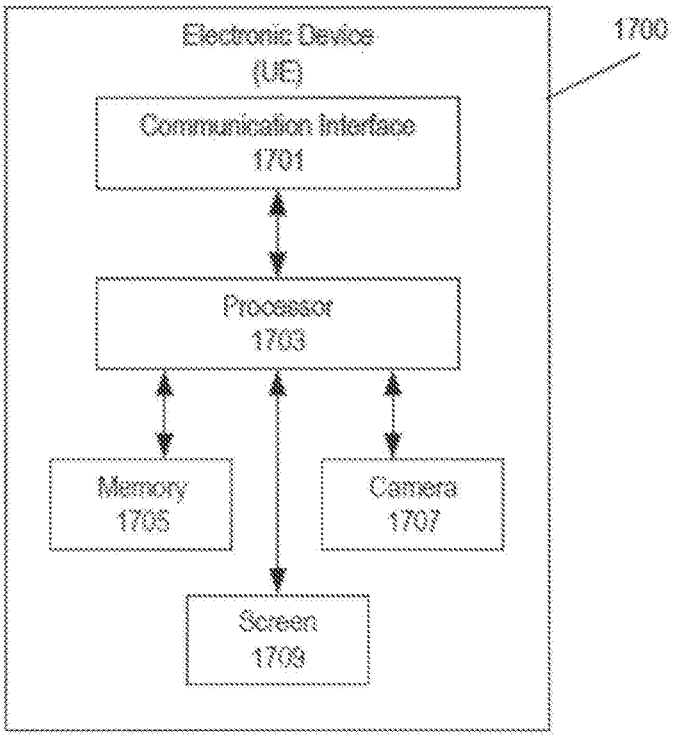

FIG. 17

METHODS PROVIDING ENCODING AND/OR DECODING OF VIDEO USING A SYNTAX INDICATOR AND PICTURE HEADER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[This application is] *This patent application is a continuation reissue application of U.S. patent application Ser. No. 18/615,173, filed Mar. 25, 2024, now U.S. Pat. No. RE50561, issued Aug. 26, 2025, which is a broadening reissue of U.S. Pat. No. 11,677,957. This patent application is also a broadening reissue of U.S. Pat. No. 11,677,957. U.S. Pat. No. 11,677,957 issued Jun. 13, 2023 from U.S. patent application Ser. No. 17/739,256 which was filed May 9, 2022 as* a continuation of U.S. patent application Ser. No. 16/640,908, filed on Feb. 21, 2020, *now U.S. Pat. No. 11,356,667, issued Jun. 7, 2022*, which itself is a 35 U.S.C. § 371 national stage application of PCT International Application No. PCT/SE2019/051260, filed on Dec. 10, 2019, which in turns claims priority to U.S. Provisional Patent Application No. 62/782,998, filed on Dec. 20, 2018, the disclosures and content of which are incorporated by reference herein in their entireties.

The present disclosure relates generally to video processing, and more particularly, video encoding and/or decoding and related methods and devices.

High Efficiency Video Coding ("HEVC") is a block-based video codec standardized by ITU-T and MPEG that uses both temporal and spatial prediction. Spatial prediction can be achieved using intra ("I") prediction from within the current picture. Temporal prediction can be achieved using uni-directional ("P") or bi-directional inter ("B") prediction on a block level from previously decoded reference pictures. A difference between original pixel data and predicted pixel data can be referred to as a residual. In an encoder, the residual can be transformed into the frequency domain, quantized, and then entropy coded before being transmitted together with prediction parameters such as prediction mode and motion vectors. The prediction parameters may also be entropy coded. By quantizing the transformed residuals, a tradeoff between bitrate and quality of the video may be controlled. The decoder can perform entropy decoding, inverse quantization, and inverse transformation to obtain the residual. The decoder can add the residual to an intra or inter prediction to reconstruct a picture.

MPEG and ITU-T are working on a successor to HEVC called Versatile Video Coding ("VVC"). Both HEVC and VVC define a Network Abstraction Layer ("NAL"). Data (e.g., both video and non-video data of HEVC and VV) is encapsulated in NAL units. The NAL unit begins with a NAL unit header, which among other things comprises the NAL unit type that identifies what type of data is carried in the NAL unit. The NAL unit type is transmitted in the nal_unit_type codeword in the NAL unit header and the type indicates and defines how the NAL unit should be parsed and decoded. A bitstream consists of a series of concatenated NAL units. An example of the syntax for the HEVC NAL unit is shown in FIG. 6 and an example of the syntax for the NAL unit header is shown in FIG. 7.

For single layer coding in HEVC, an access unit ("AU") is the coded representation of a picture, which may consist of several video coding layer ("VCL") NAL units as well as non-VCL NAL units. A coded video sequence ("CVS") in HEVC is a series of access units starting at an intra random access point ("IRAP") access unit up to, but not comprising the next IRAP access unit in decoding order. The decoding order is the order in which NAL units may be decoded, which is the same as the order of the NAL units within the bitstream. The decoding order may be different from the output order, which is the order in which decoded pictures are to be output, such as for display, by the decoder.

Non-VCL NAL units are NAL units that do not carry coded sample values directly, such as for example parameter sets. Both VVC and HEVC define picture parameter set ("PPS") and sequence parameter set ("SPS"), which comprise parameters valid for a picture or a sequence respectively. In HEVC there is another parameter set, video parameter set ("VPS"), that comprises information valid for several layers. A new VPS can be activated at the start of a new CVS. When VVC is finalized it may or may not comprise a VPS or similar.

The first byte of each NAL unit in VVC and HEVC contains the nal_unit_type syntax element. A decoder or bitstream parser can conclude how the NAL unit should be handled, e.g. parsed and decoded, after looking at the first byte.

The VVC video coding standard may use a block structure referred to as quadtree plus binary tree plus ternary tree block structure ("QTBT+TT") where each picture is first partitioned into square blocks called coding tree units ("CTUs"). The size of all CTUs are identical and the partition is done without any syntax controlling it. Each CTU is further partitioned into coding units ("CUs") that can have either square or rectangular shapes. The CTU is first partitioned by a quad tree structure, then it may be further partitioned with equally sized partitions either vertically or horizontally in a binary structure to form coding units ("CUs"). A block can have either a square or rectangular shape. The depth of the quad tree and binary tree can be set by the encoder in the bitstream. An example of dividing a CTU using QTBT is illustrated in FIGS. 1A-B. The ternary tree ("TT") part adds the possibility to divide a CU into three partitions instead of two equally sized partitions; this increases the possibilities to use a block structure that better fits the content structure in a picture.

The concept of slices in HEVC divides the picture into independently coded slices, where each slice is read in raster scan order in units of CTUs. Different coding types could be used for slices of the same picture, i.e. a slice could either be an I-slice, P-slice or B-slice. Slices can enable resynchronization in case of data loss.

VVC may not use traditional slices as in HEVC. Instead tiles may play a larger role in VVC due to increased demand for spatial random access from video services comprising VR streaming.

The VVC video coding standard may comprise a tool called tiles that divides a picture into rectangular spatially independent regions. Tiles in the draft VVC coding standard are very similar to the tiles used in HEVC. Using tiles, a picture in VVC can be partitioned into rows and columns of samples where a tile is an intersection of a row and a column. FIG. 2 shows an example of a tile partitioning using 4 tile rows and 5 tile columns resulting in a total of 20 tiles for the picture.

The tile structure can be signaled in the picture parameter set ("PPS") by specifying the thicknesses of the rows and the widths of the columns. Individual rows and columns can have different sizes, but the partitioning may span across the entire picture, from left to right and top to bottom respectively.

There is no decoding dependency between tiles of the same picture. This comprises intra prediction, context selection for entropy coding and motion vector prediction. One exception is that in-loop filtering dependencies may be allowed between tiles.

The bits of a coded picture in VVC are partitioned into tile_group_layer_rbsp( ) data chunks, where each such chunk is encapsulated into its own group NAL unit. The data chunk comprises a tile group header and tile group data, where the tile group data comprises an integer number of coded complete tiles. FIGS. 8-10 show the related draft VVC specification standard syntax. FIG. 8 shows a tile group layer RBSP in the draft VVC standard. FIG. 9 shows a tile group header in the draft VVC standard.

The tile group header can start with a tile_group_pic_parameter_set_id syntax element. This element can specify the PPS that should be activated and used for decoding the tile group. The tile_group_address code word specifies the tile address of the first tile in the tile group. The next code word in the tile group header, num_tiles_in_tile_group_minus1, can specify the number of tiles there are in the tile group.

tile_group_type can specify the coding type of the tile group. It can specify what prediction types, intra prediction, uni-directional prediction, or bi-directional prediction are present in the tile group.

log 2_diff_ctu_max_bt_size can specify the difference between the luma CTB size and the maximum luma size (width or height) of a coding block that can be split using a binary split.

sbtmvp_size_override_flag can specify whether the syntax element log 2_sbtmvp_active_size_minus2 is present for the current tile group.

log 2_sbtmvp_active_size_minus2 plus 2 can specify the value of the block size that is used for deriving the motion parameters for a particular motion compensation mode (temporal motion vector prediction) for the current tile group. When log 2_sbtmvp_size_active_minus2 is not present, it can be inferred to be equal to a default value.

tile_group_temporal_mvp_enabled_flag can specify whether temporal motion vector predictors can be used for inter prediction.

mvd_l1_zero_flag equal to 1 can indicate that some delta motion vectors are always equal to zero.

collocated_from_l0_flag can specify whether the collocated picture used for temporal motion vector prediction is derived from reference picture list 0 or reference picture list 1.

six_minus_max_num_merge_cand can specify the maximum number of merging motion vector prediction ("MVP") candidates supported in the tile group subtracted from 6.

dep_quant_enabled_flag can specify whether the dependent quantization coding tool is enabled or disabled.

sign_data_hiding_enabled_flag can specify whether the sign data hiding tool is enabled or disabled.

If there are more than one tile in the tile group, the entry points of the tiles except the first one can be signaled. First there is a code word, offset_len_minus1, that specifies the number of bits used for signaling each of the offsets. Then there is a list of entry point offset code words; entry_point_offset_minus1. These specify byte offsets in the bitstream that can be used by a decoder to find the starting point of each tile in order to decode them in parallel. Without these offsets, a decoder would have to parse tile data in order to find out where each tile starts in the bitstream. The first tile in the tile group immediately follows after the tile group header so there is no byte offset sent for that tile. This means that the number of offsets is one less than the number of tiles in the tile group.

FIG. 10 shows tile group data in the draft VVC standard. The tile group data can comprise coded data for CTUs in the tile group. In this example, there is a for loop over all tiles in the tile group. Inside that for loop there is another for loop over all CTUs in the tile. The number of CTUs in different tiles may differ as the tile row heights and tile column widths may not be equal. For entropy coding reasons, there can be a bit set to one at the end of each tile. Each tile ends with a byte alignment which means that the data for each tile in the tile group starts on an even byte address in the bitstream. This is can allow entry points to be specified in number of bytes. The tile group header also ends with a byte alignment.

In some embodiments, the term segment can be used as a more general term than tiles, since the solutions in this application can be applied to different kinds of picture partitioning schemes and not only tile partitions known from HEVC and the VVC draft. A tile is one example of a segment, but other examples may exist.

FIGS. 3A-C show a picture 10 of a video stream and an exemplary partitioning of the picture into units 8, segments 11 and segment groups 12. FIG. 3A shows a picture 10 that comprises 64 units 8. FIG. 3B shows the segment partition structure 13 of the same picture 10 comprising of 16 segments 11. The partition structure 13 is shown by dashed lines. Each segment 11 comprises a number of units. A segment can either comprise an integer number of complete units or a combination of complete and partial units. A number of segments form a segment group. FIG. 3C shows the segment group partitioning of the same picture 10 that comprises 8 segment groups. The segment group may comprise segments in raster scan order. Alternatively, the segment group may comprise any group of segments that together form a rectangle. Alternatively, the segment group may comprise any subset of segments.

FIG. 4 shows a picture 10 where the dashed lines show a partition structure dividing the picture into four segments. FIG. 4 also shows three units 16, 17, 18. As shown in the figure, two units 16, 17 belong to one current segment 15 and one unit 18 belongs to a different, neighboring segment 14. The segments are independent with respect to other segments which means that segment boundaries are handled similar to picture boundaries when decoding the units. This affects the derivation process of elements during decoding such as e.g. the derivation of intra prediction modes and the derivation of quantization parameter values.

Intra modes can be used and signaled for units that only use prediction from previously decoded samples of the current picture for sample prediction. The derivation of the intra prediction mode in a current unit 16 depends on previously derived intra prediction modes in other, neighboring units 17. With segments being independent, the derivation of the intra prediction mode in a current unit 16 may only depend on previously derived intra prediction modes in units 17 that belong to the current segment 15 and may not depend on any intra prediction mode in any unit 18 that belongs to a different segment 14.

The partition structure in FIG. 4 can make the intra prediction modes in units 18 in a different segment 14 unavailable for the derivation of the intra prediction mode for the units 16 in a current segment 15. The mode in some units 18 in a different segment may have been used for derivation of an intra prediction mode in a unit 16 in a current segment 15 if those units would have belonged to the same segment. Instead, the segment boundary may have the same effect on intra mode derivation as a picture boundary for the units 16 in a current segment 15.

In some embodiments, a segment may be equivalent to a tile or slice. A segment group may be equivalent to a tile group. A segment header is the header of a segment or a segment group. A segment header may be equivalent to a tile group header or a slice header. In some embodiments, "tile" and "segment" can be used interchangeably. A unit may be equivalent to a CTU. In some embodiments, the terms "partition", "structure" and "partition structure" can be used interchangeably.

SUMMARY

A first aspect of the embodiments defines a method for processing encoded image data. The method comprises receiving an encoded bitstream comprising parameter set information. The parameter set information may comprise a syntax indicator, a first coded portion comprising first coded sample information for a picture and a second coded portion comprising second coded sample information for the picture. The method further comprises, responsive to a first value of the syntax indicator, decoding the first coded sample information using a picture header syntax element from a picture header of the encoded bitstream. The method further comprises, responsive to the first value of the syntax indicator, decoding the second coded sample information using the picture header syntax element from the picture header of the encoded bitstream.

A second aspect of the embodiments defines a method of generating encoded image data comprising generating the encoded bitstream according to the first aspect.

A third aspect of the embodiments defines an electronic device comprising a processor and a memory coupled with the processor. The memory comprises instructions that, when executed by the processor, causes the electronic device to perform operations according to the first or the second aspect.

A fourth aspect of the embodiments defines a computer program comprising program code to be executed by at least one processor of an electronic device, whereby execution of the program code causes the electronic device to perform a method according to the first or the second aspect.

A fifth aspect of the embodiments defines a computer program product comprising a non-transitory storage medium comprising program code to be executed by at least one processor of an electronic device, whereby execution of the program code causes the electronic device to perform a method according to any of the first or the second aspect.

According to some embodiments disclosed herein, a bitrate of encoded bitstreams for videos can be reduced while improving error resilience by using a syntax indicator and a picture header.

BRIEF DESCRIPTION OF THE DRAWINGS

The accompanying drawings, which are comprised to provide a further understanding of the disclosure and are incorporated in and constitute a part of this application, illustrate certain non-limiting embodiments of inventive concepts. In the drawings:

FIG. 6 is a table illustrating an example of HEVC NAL unit syntax;

FIG. 7 is a table illustrating an example of HEVC NAL unit header syntax;

FIG. 8 is a table illustrating an example of a tile group layer RBSP in the draft VVC standard;

FIG. 9 is a table illustrating an example of a tile group header in the draft VVC standard;

FIG. 10 is a table illustrating an example of tile group data in the draft VVC standard;

FIG. 11 is a table illustrating an example of NAL unit types according to some embodiments of inventive concepts;

FIG. 12 is a table illustrating an example of picture header RBSP according to some embodiments of inventive concepts;

FIG. 13 is a table illustrating an example of sequence parameter set RBSP according to some embodiments of inventive concepts;

FIG. 14 is a table illustrating an example of tile group header according to some embodiments of inventive concepts;

FIG. 15 is a table illustrating an example of common header syntax according to some embodiments of inventive concepts;

FIG. 16 is a table illustrating an example of byte alignment suppression according to some embodiments of inventive concepts;

FIG. 17 is a block diagram of an example of an electronic device (UE) for encoding or decoding a bitstream with an optional picture header according to some embodiments of inventive concepts;

DETAILED DESCRIPTION

Figure 1A:
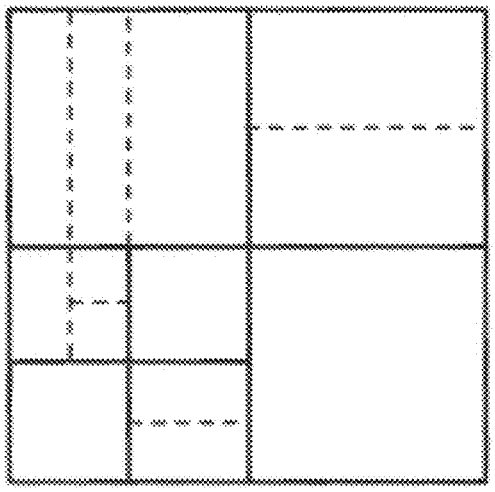
FIG. 1A-B are schematic diagrams illustrating examples of a partitioning of a CTU into CUs using QTBT.
Figure 1B:
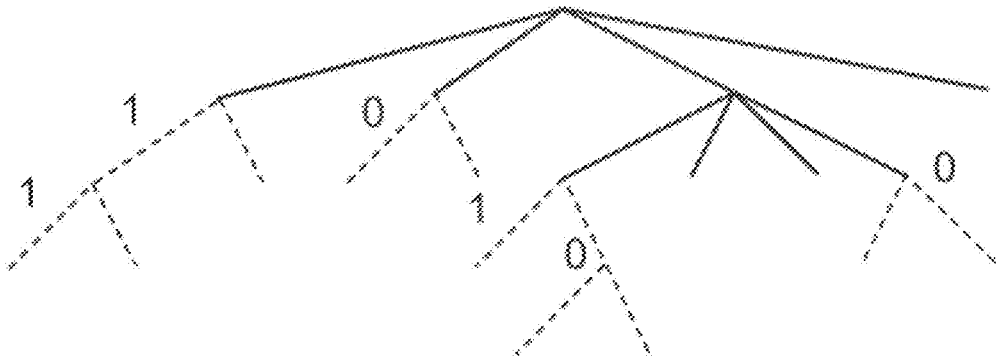
Figure 2:
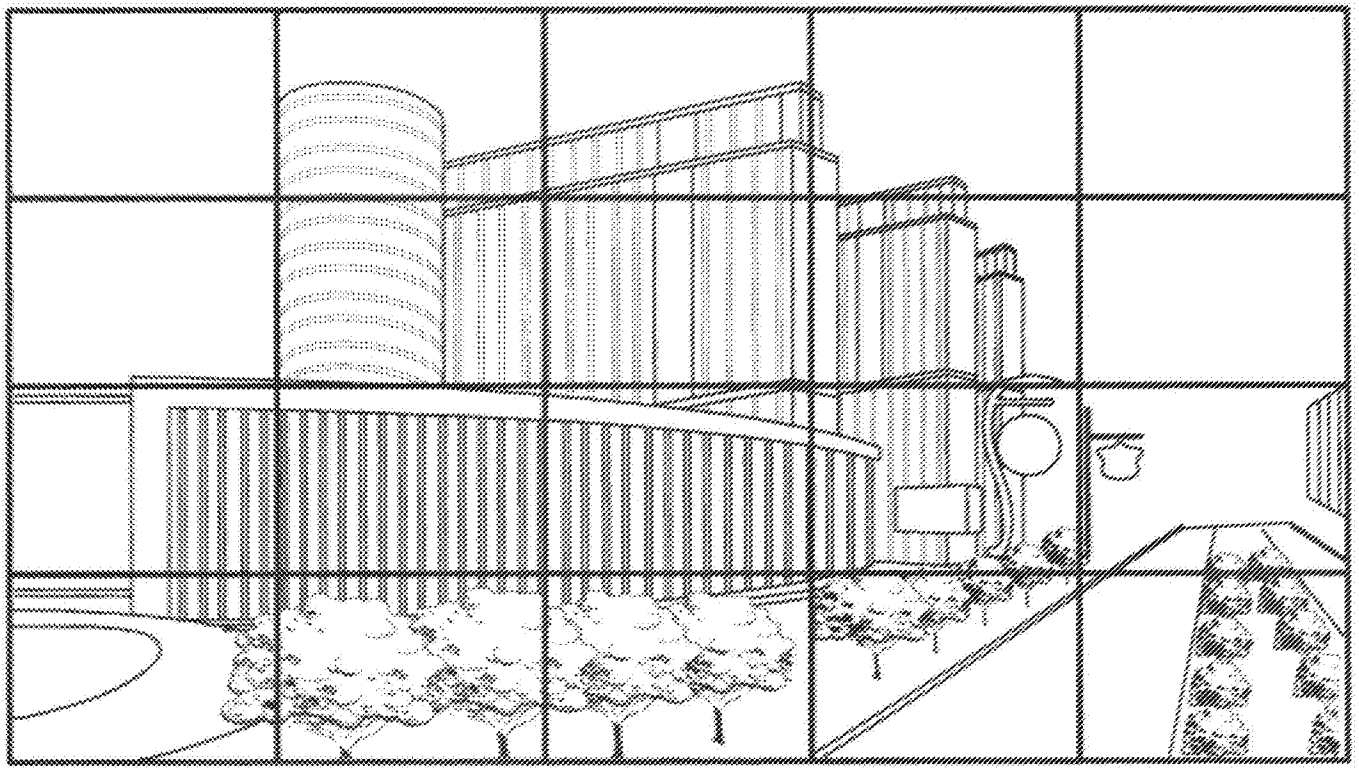
FIG. 2 is a schematic diagram illustrating an example of a tile partitioning of a picture.
Figure 3A:
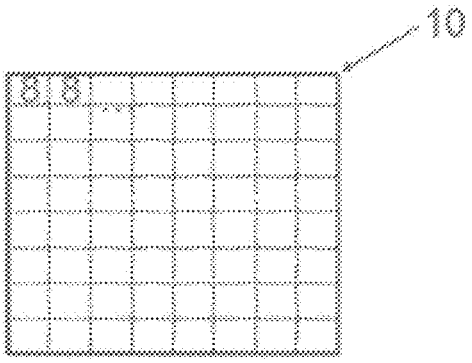
FIGS. 3A-C are schematic diagrams illustrating examples of partitions of a picture into segment groups, segments, and units.
Figure 3B:
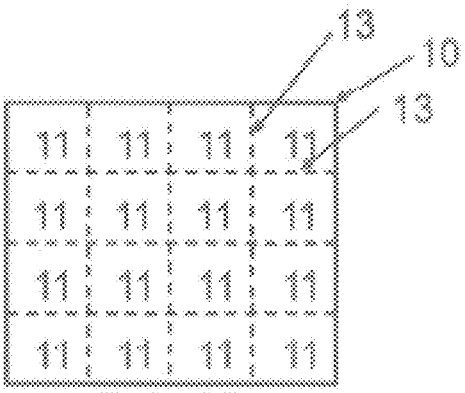
Figure 3C:
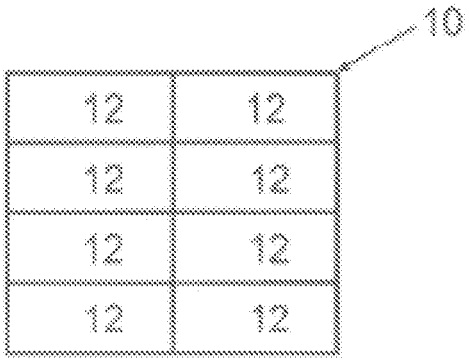
Figure 4:
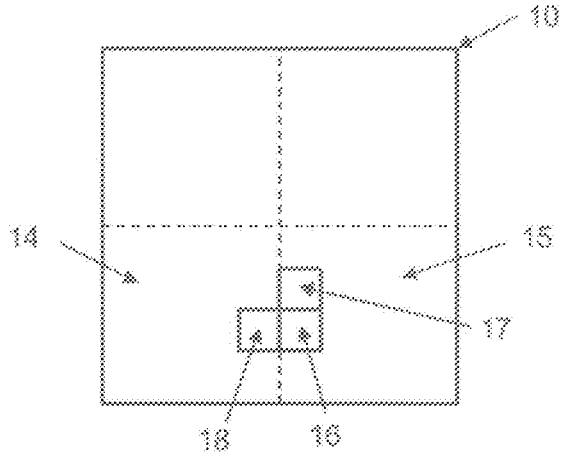
FIG. 4 is a schematic diagram illustrating an example of segments and intra prediction modes.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

A problem with the use of segments may be that segment headers can contribute significantly to the bitrate of a video stream if the pictures are partitioned into many segments. It can be observed that the values of many segment header syntax elements are identical for all segments of the same picture. This means that the bitrate cost of segment headers can be reduced by signaling segment header information once or a few times per picture instead of repeating the same syntax elements for every segment. Some embodiments described herein comprise the APS proposed for HEVC and the header parameter set proposed in JVET-L0183 for VVC.

A problem with the existing proposed solutions to reduce the segment header overhead is the error resilience properties of those solutions.

In JVET-L0183 option 1, segment header syntax elements may optionally be moved to the PPS. This means that an encoder may send one picture parameter set per picture. If a PPS is lost due to packet losses, a decoder may not be able to detect the loss and the decoding may be erroneous. In some examples, a PPS is sent in the access unit of a picture and the PPS is lost. If there is another, previously sent PPS with the same PPS id, a decoder will decode the picture using that other PPS which may lead to erroneous decoding.

In JVET-L0183 option 2, a header parameter set ("HPS") is introduced where the HPS may or may not be sent in an AU. This may result in a lost HPS for which a decoder may not be able to detect the loss. In some examples, a HPS is sent in the access unit of a picture and the HPS is lost. If there is another, previously sent HPS with the same HPS id, a decoder will decode the picture using that other HPS which may lead to erroneous decoding.

Various embodiments described herein may address this error resilience problem by introducing a sequence parameter set flag, sps_picture_header_enabled_flag, and a picture header. Some of the syntax elements that are currently in the segment header are moved to a separate syntax group common_segment_header( ). If the flag sps_picture_header_enabled_flag is equal to 0, the common_segment_header group is present in each segment header meaning that traditional segment headers are used. If the flag is equal to 1, there may be no common_segment_header group in any segment header. Instead, there may be a picture header present in each access unit that contains the common_segment_header( ).

In some embodiments, the flag is renamed to sps_picture_header_repeated_flag. A picture header can be present in each access unit regardless of the value of the flag. If the flag is equal to 0, the common_segment_header group is present in the picture header only and not in the segment header. If the flag is equal to 1, the common_segment_header group is present in every segment header and not in any picture header. In additional or alternative embodiments, the common_segment_header group is also present in every picture header. According to some embodiments, error robustness may be preserved such that the decoder may be aware of any loss of information.

If sps_picture_header_enabled_flag is equal to 0, the solution is identical to the current use of segment header which enables a decoder to be loss aware. If the flag is equal to 1, then any loss of a picture header is immediately detected since there may be one picture header present in each access unit.

According to some other embodiments, any loss of picture header may be immediately detected since there may be one picture header present in each access unit.

Some embodiments comprise a proposed picture header. The picture header can be a separate byte-aligned entity in the bitstream. In the HEVC or VVC video coding framework, the proposed picture header can be implemented as a separate NAL unit with its own NAL unit type. The proposed NAL unit type is PIC_NUT, as a name used in some embodiments.

A parameter set flag can be used that specifies whether picture headers are used or not. The flag can be put in the sequence parameter set and can control the presence of picture headers in the entire CVS or in the entire bitstream. Additionally or alternatively, the flag may be put in a VPS or another parameter set.

In some embodiments, syntax elements that are common for multiple segment headers in a picture can be put into a separate syntax table called common_tile_group_header( ) and can introduce the following rules on the presence and location of the picture header and that syntax table: (1) If the parameter set flag is equal to a first value, there may be no picture header anywhere in the CVS and all syntax elements in common_tile_group_header( ) may be comprised in every segment header in the CVS; (2) If the parameter set flag is equal to a second value, there may be exactly one picture header for each picture in the CVS. In other words, there may be exactly one picture header in every AU in the CVS. The picture header comprises all syntax elements in common_tile_group_header( ) and the syntax elements in common_tile_group_header( ) may not be present in any segment header in the CVS; and (3) If picture headers are present, the picture header may be located before any VCL NAL unit of the same access unit.

In additional or alternative embodiments, the picture header and the access unit delimiter are merged, such that the syntax elements in common_tile_group_header( ) are present in the access unit delimiter when the parameter set flag is equal to a second value. An access unit delimiter is a NAL unit with its own NAL unit type that can be used to indicate the boundary between two access units. An access unit delimiter can be present in the bitstream as the very first NAL unit in an access unit, or alternatively as the very last NAL unit in an access unit, thereby providing the indication. In HEVC, the access unit delimiter payload may carry an indication of the type of slices present in the coded pictures in the access unit containing the access unit delimiter NAL unit and to simplify the detection of the boundary between access units. There is no normative decoding process associated with the access unit delimiter in HEVC.

In this embodiment, if the access unit delimiter and the picture header is merged, there will be a joint NAL unit type carrying both types of data. This means that the picture header information is sent as the very first (or very last) NAL unit in the access units where it is present. A joint NAL unit type could go under the name Access unit delimiter NAL unit, picture header NAL unit, or any other name.

With a joint NAL unit type, assumed to be called access unit delimiter, the rules may look as follows: (1) If the parameter set flag is equal to a first value, there may be no picture header information present in any access unit NAL unit in the CVS and all syntax elements in common_tile_group_header( ) may be comprised in every segment header in the CVS; (2) If the parameter set flag is equal to a second value, there may be exactly one access unit delimiter NAL unit for each picture in the CVS. In other words, there may be exactly one picture header in every AU in the CVS. The access unit delimiter NAL unit may comprise all syntax elements in common_tile_group_header( ) and the syntax elements in common_tile_group_header( ) may not be present in any segment header in the CVS; and (3) The access unit delimiter NAL unit may precede all other NAL units that belong to the same access unit. In other words, the access unit delimiter NAL unit may be the first NAL unit in its access unit if it is present.

Figure 5:
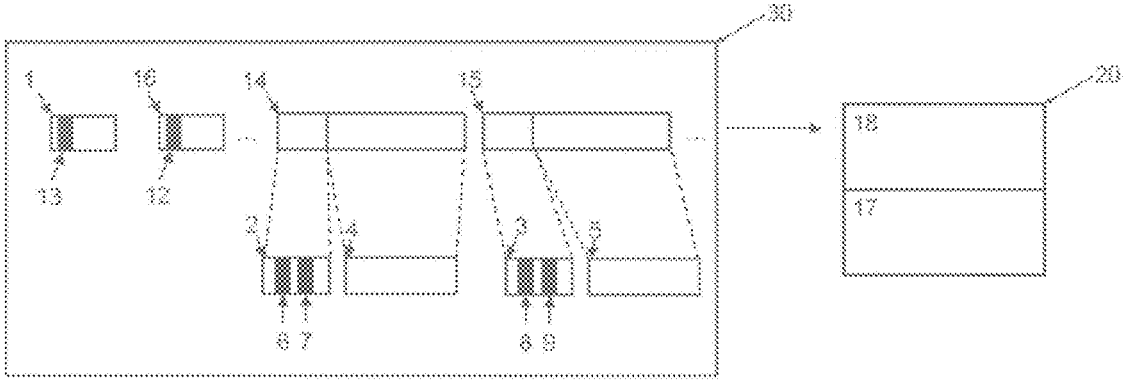
FIG. 5 is a block diagram illustrating an example of a bitstream with a picture header according to some embodiments of inventive concepts.

In some embodiments, picture headers are optional in the bitstream, but if they are present, they are present for all access units in the CVS. FIG. 5 shows a bitstream 30 and a corresponding decoded current picture 20. The bitstream comprises a parameter set 1 and a coded picture comprising an optional picture header 16, a coded first portion 14 and a coded second portion 15. The coded first portion 14 is decoded into a decoded first portion of sample values 18 and the coded second portion is decoded into a decoded second portion of sample values 17. The parameter set 1, the picture header 16, the coded first portion 14 and the coded second portion 15 may be packed in separate units. The units may be byte aligned and may be NAL units or similar.

The first and second coded portions 14, 15 are decoded by decoding the following five elements: 1) The parameter set information 1 can be a sequence parameter set that is used for decoding multiple pictures and not just one picture as in this example; 2) Header information 2 for the first portion; 3) Header information 3 for the second portion; 4) Coded sample information 4 for the first portion; and 5) Coded sample information 5 for the second portion.

The coded sample information 4, 5 may, for example, be the tile group data in the VVC draft.

The parameter set information contains a parameter set syntax element 13, that is indicative of at least a first and second value. It can be a one-bit flag in the SPS.

The header information for the first portion 2 comprises a first group of syntax elements 6, 12 and a second group of syntax elements 7 where the second group of syntax elements 7 and the coded sample information for the first portion 4 are located in the first coded portion 14. The first group of syntax elements 6, 12 may be located either in the header information for the first portion 2 or in a separate packet 16 as explained below.

The header information for the second portion 3 comprises a third group of syntax elements 8, 12 and a fourth group of syntax elements 9 where the fourth group of syntax elements 9 and the coded sample information for the second portion 5 are located in the second coded portion 15. The third group of syntax elements 8, 12 may be located either in the header information for the second portion 3 or in a separate packet 16 as explained below.

Now, if the syntax element 13 is of a first value, the first group of syntax elements 6 is present and located in the first coded portion 14 and the third group of syntax elements 8 is present and located in a second coded portion 15. The decoding of the first coded portion 14 is done by using syntax element values from the first 6 and second 7 group and the decoding of the second portion 15 is done by using syntax element values from the third 8 and fourth 9 group. The presence of the separate packet 16 is dependent on the syntax element 13 and if the syntax element 13 is of a first value, the separate packet 16 is not present in the bitstream.

But if the syntax element 13 is of a second value, the first group 6 and the third group 8 of syntax elements are not present in the first coded portion 14 and second coded portion 15. Instead, a single group 12 located in a separate packet 16 is present. The separate packet 16 precedes any packets carrying sample information for the picture. It therefore precedes the first 14 and second 15 coded portions. The separate packet 16 is positioned after any packets carrying sample information for any previous picture in decoding order. The separate packet 16 can be comprised in the access unit that contains the current picture as a NAL unit and the NAL unit precedes any VCL NAL unit in the access unit. The decoding of the first coded portion 14 is done by using syntax element values from the single 12 and second 7 group and the decoding of the second coded portion 15 is done by using syntax element values from the single 12 and fourth 9 group.

In some embodiments, any syntax element that is present in any of the single 12, first 6 and third 8 group is also present in all three groups 12,6,8. This can be implemented as a joint syntax structure that is parsed either from the separate packet 16 or from the header information 2, 3 depending on the value of the syntax element 13. Likewise, any syntax element present in any of the second 7 and fourth 9 group is also present in the other group. On top of the draft VVC specification, this embodiment may look as depicted in FIGS. 11-14. FIG. 11 shows NAL unit types, FIG. 12 shows a picture header RBSP, FIG. 13 shows a sequence parameter set RBSP, and FIG. 14 shows a tile group header. FIG. 12 shows a picture header RBSP.

sps_picture_header_enabled_flag equal to 1 specifies that one picture header NAL unit may be present in all access units in the CVS. sps_picture_header_enabled_flag equal to 0 specifies that there may be no picture header NAL units in the CVS.

FIG. 14 shows a tile group header. The semantics of all syntax elements in tile_group_header is identical to the latest VVC draft:

tile_group_pic_parameter_set_id specifies the value of pps_pic_parameter_set_id for the PPS in use. The value of tile_group_pic_parameter_set_id may be in the range of 0 to 63, inclusive.

tile_group_address specifies the tile address of the first tile in the tile group. The length of tile_group_address is Ceil(Log 2 (NumTilesInPic)) bits. The value of tile_group_address may be in the range of 0 to NumTilesInPic−1, inclusive, and the value of tile_group_address may not be equal to the value of tile_group_address of any other coded tile group NAL unit of the same coded picture. When tile_group_address is not present it is inferred to be equal to 0.

num_tiles_in_tile_group_minus1 plus 1 specifies the number of tiles in the tile group. The value of num_tiles_in_tile_group_minus1 may be in the range of 0 to NumTilesInPic−1, inclusive. When not present, the value of num_tiles_in_tile_group_minus1 is inferred to be equal to 0.

offset_len_minus1 plus 1 specifies the length, in bits, of the entry_point_offset_minus1[i] syntax elements. The value of offset_len_minus1 may be in the range of 0 to 31, inclusive.

entry_point_offset_minus1[i] plus 1 specifies the i-th entry point offset in bytes, and is represented by offset_len_minus1 plus 1 bits. The tile group data that follow the tile group header consists of num_tiles_in_tile_group_minus1+1 subsets, with subset index values ranging from 0 to num_tiles_in_tile_group_minus1, inclusive. The first byte of the tile group data is considered byte 0. When present, emulation prevention bytes that appear in the tile group data portion of the coded tile group NAL unit are counted as part of the tile group data for purposes of subset identification. Subset 0 consists of bytes 0 to entry_point_offset_minus1[0], inclusive, of the coded tile group data, subset k, with k in the range of 1 to num_tiles_in_tile_group_minus1−1, inclusive, consists of bytes firstByte[k] to lastByte[k], inclusive, of the coded tile group data with firstByte[k] and lastByte[k] defined as:

$$1.\ \text{firstByte}[k] = \sum_{n=1}^{k}(\text{entry_point_offset_minus}[n-1]+1) \tag{737}$$

$$2.\ \text{lastByte}[k] = \text{firstByte}[k] + \text{entry_point_offset_minus1}[k] \tag{738}$$

The last subset (with subset index equal to num_tiles_in_tile_group_minus1) consists of the remaining bytes of the coded tile group data.

Each subset may consist of all coded bits of all CTUs in the tile group that are within the same tile.

FIG. 15 shows a common header syntax. The semantics of all syntax elements in common_tile_group_header( ) is identical to the syntax elements in tile_group_header( ) in the latest VVC draft. A decoder may perform all or a subset of the following steps for decoding a video coding layer NAL unit using this embodiment:

1. The decoder decodes a flag from a parameter set that specifies whether picture headers are used or not. The flag can be located in a sequence parameter set.

2. The decoder activates the parameter set by decoding one or more syntax elements from the bitstream that indicates activation of the parameter set.

3. If the flag was decoded to a first value, the decoder deduces that there may be no picture headers in the coded video bitstream. The decoder decodes a set of syntax elements S from a VCL NAL unit of a coded picture in the coded video bitstream and uses the decoded values of the set S when decoding the VCL NAL unit.

4. If the decoder detects the presence of a picture header in the coded video sequence when the value of the flag comprised in an active parameter set is equal to a first value, the decoder concludes that the bitstream is not compliant with codec specification and may interpret that as a bit-error, loss of data or non-compliant bitstream or encoder. It may report the error, perform error concealment or take other actions based on the knowledge that the bitstream is not compliant.

5. If the flag was decoded to a second value, the decoder deduces that there may be a picture header present in every access unit in the coded video bitstream. The decoder decodes a set of syntax elements T from a picture header for a picture of an access unit and uses the decoded values of the set T when decoding a VCL NAL unit of that access unit, where the set T contains the same syntax elements as the set S.

6. If the decoder detects that there is no picture header present for an access unit when the value of the flag comprised in an active parameter set is equal to a second value, the decoder concludes that the bitstream is not compliant with codec specification and may interpret that as a bit-error, loss of data or non-compliant bitstream or encoder. It may report the error, perform error concealment or take other actions based on the knowledge that the bitstream is not compliant.

The picture header in the steps above may be carried in a NAL unit having a specific NAL unit type that indicates that the NAL unit contains picture header syntax elements.

In some embodiments, there may be a mandatory picture header present in each access unit of the bitstream. The picture header may be located before any VCL NAL unit in the access unit. The picture header can be a separate byte-aligned entity in the bitstream. In the HEVC or VVC video coding framework, the proposed picture header is implemented as a separate NAL unit with its own NAL unit type. The proposed NAL unit type is PIC_NUT, but that is just a name used to describe this embodiment.

Some embodiments can also comprise putting syntax elements that are common for multiple segment headers in a picture into a separate syntax table called common_tile_group_header( ) and to introduce the following rules on the presence and location of that syntax table:

1 If a parameter set flag is equal to a first value, all syntax elements in common_tile_group_header( ) may be comprised in every segment header in the CVS and there may be no syntax element in common_tile_group_header( ) present in any picture header in the CVS 2 If the parameter set flag is equal to a second value, all syntax elements in common_tile_group_header( ) may be comprised in every picture header in the CVS and there may be no syntax element in common_tile_group_header( ) present in any segment header in the CVS There may be syntax elements in the picture header that are present there regardless of where the syntax elements of common_tile_group_header( ) is located. One non-limiting example is pic_parameter_set_id.

There may be syntax elements in the segment header that are present there regardless of where the syntax elements of common_tile_group_header( ) is located. One non-limiting example is tile group address or slice address related syntax elements. Another non-limiting example is entry point offset related syntax elements.

In one variant of the proposed solution, the picture header and the access unit delimiter are merged, such that the syntax elements in common_tile_group_header( ) are present in the access unit delimiter when the parameter set flag is equal to a second value.

The flag above can be put in the sequence parameter set and that it controls the location of common_tile_group_header( ) in the entire coded video sequence (CVS) or in the entire bitstream. In alternative solutions of this invention the flag may instead be put in a VPS or another parameter set.

Some embodiments can be used together with any of the previous embodiments in this description.

In some embodiments, the common_tile_group_header( ) syntax elements are split into multiple syntax element groups. For each group it is indicated where the syntax elements in that group is located, either in the segment header or in the picture header.

In some embodiments, no code words are sent in the tile group header or slice header if the flag indicates that the syntax element group or all syntax element groups are located in the picture header and there is only one tile in the tile group header or slice header.

This is shown in the proposed tile group header syntax below, where the presence of the picture parameter set ID is conditioned on the parameter set flag. If there is only one tile in the tile group or slice, the variable NumTilesInPic is set to 1 and therefore the tile_group_address syntax element is not present in the tile group header but inferred to be equal to 0. Likewise, the num_tiles_in_tile_group_minus1 syntax element is not present either but is inferred to be equal to 0. Therefore, no offset_len_minus1 nor entry_point_offset_minus1 syntax elements are present.

Bits for performing byte alignment are not present since with an empty tile_group_header( ) syntax structure, the tile_group_header( ) is byte aligned in the sense that the very next bit after the syntax structure will be positioned at a byte-aligned bit position. FIG. 16 is a table illustrating an example of byte alignment suppression.

In some embodiments, a method is disclosed for decoding a picture 20 from a bitstream 30, the method comprising decoding a coded first portion 14 and a coded second portion 15 of the picture into a decoded first portion 16 and a decoded second portion 17 of sample values. The method can comprise decoding a coded first portion 14 and a coded second portion 15 of a coded picture by decoding the following five elements: parameter set information 1, header information for the first portion 2, header information for the second portion 3, coded sample information for the first portion 4 and coded sample information for the second portion 5. The parameter set information 1 contains a parameter set syntax element 13 indicative of at least a first value and a second value. The header information for the first portion 2 consists of a first group 6 of syntax elements and a second group 7 of syntax elements where the second group of syntax elements 7 and the coded sample information for the first portion 4 are located in the first portion 14. The header information for the second portion 3 consists of a third group 8 of syntax elements and a fourth group 9 of syntax elements where the fourth group of syntax elements 9 and the coded sample information for the second portion 5 are located in the second portion 15. If the syntax element 13 is of a first value, the location of the first group 6 of syntax element is located in the first portion 14 and the location of the third group 8 of syntax elements is located in a second portion 15, and the decoding of the first portion 14 is done by using syntax element values from the first 6 and second 7 group and the decoding of the second portion 15 is done by using syntax element values from the third 8 and fourth 9 group. If the syntax element 13 is of a second value, the first group 6 and the third group 8 are not present in the first 14 and second 15 portion. Instead, a single group 12 is located in a separate 16 packet ordered before any packets carrying sample information for the picture, comprising before the first and second portions, but after any packets carrying sample information for any previous picture in decoding order, and the decoding of the first portion 14 is done by using syntax element values from the single 12 and second 7 group and the decoding of the second portion 15 is done by using syntax element values from the single 12 and fourth 9 group. Any syntax element present in any of the single, first and third group is also present in any of the single, first and third group, and any syntax element present in any of the second and fourth group is also present in any of the second and fourth group.

FIG. 17 is a block diagram illustrating an electronic device 1700 (which may be a wireless device, a 3GPP user equipment or UE device, etc.) according to some embodiments disclosed herein. As shown, electronic device 1700 may comprise processor 1703 coupled with communication interface 1701, memory 1705, camera 1707, and screen 1709. Communication interface 1701 may comprise one or more of a wired network interface (e.g., an Ethernet interface), a WiFi interface, a cellular radio access network (RAN) interface (also referred to as a RAN transceiver), and/or other wired/wireless network communication interfaces. Electronic device 1700 can thus provide wired/wireless communication over one or more wire/radio links with a remote storage system to transmit and/or receive an encoded video sequence. Processor 1703 (also referred to as a processor circuit or processing circuitry) may comprise one or more data processing circuits, such as a general purpose and/or special purpose processor (e.g., microprocessor and/or digital signal processor). Processor 1703 may be configured to execute computer program instructions from functional modules in memory 1705 (also referred to as a memory circuit or memory circuitry), described below as a computer readable medium, to perform some or all of the operations and methods that are described herein for one or more of the embodiments. Moreover, processor 1703 may be defined to comprise memory so that separate memory 1705 may not be required. Electronic device 1700 comprising, communication interface 1701, processor 1703, and/or camera 1707 may thus perform operations, for example, discussed below.

According to some embodiments, electronic device 1700 (e.g., a smartphone) may generate an encoded video sequence that is either stored in memory 1705 and/or transmitted through communication interface 1701 over a wired network and/or wireless network to a remoted device. In such embodiments, processor 1703 may receive a video sequence from camera 1709, and processor may encode the video sequence to provide the encoded video sequence that may be stored in memory 1705 and/or transmitted through communication interface 1701 to a remote device.

According to some other embodiments, electronic device 1700 may decode an encoded video sequence to provide a decoded video sequence that is rendered on display 1709 for a user to view. The encoded video sequence may be received from a remote communication device through communication interface 1701 and stored in memory 1705 before decoding and rendering by processor 1703, or the encoded video sequence may be generated by processor 1703 responsive to a video sequence received from camera 1707 and stored in memory 1705 before decoding and rendering by processor 1703. Accordingly, the same device may thus encode a video sequence and then decode the video sequence. Operations of encoding and decoding performed by processor 1703 will now be discussed with reference to FIGS. 18-19.

Operations of electronic device 1700 will now be discussed with reference to the flow chart of FIG. 18 according to some embodiments of inventive concepts. For example, modules (also referred to as units) may be stored in memory 1705 of FIG. 17, and these modules may provide instructions so that when the instructions of a module are executed by processor 1703, processor 1703 performs respective operations of the flow chart of FIG. 18.

According to some embodiments of inventive concepts, electronic device 1700 may decode an encoded bitstream corresponding to a plurality of pictures. The encoded bitstream can comprise a parameter set, an optional picture header, a first coded portion comprising first coded sample information for a picture, and a second coded portion comprising second coded sample information for the picture. At block 1810, processor 1703 may obtain the encoded bitstream, for example, by receiving the encoded bitstream from a remote source over a network though communication interface 1701 and/or by retrieving the encoded bitstream from memory 1705. According to some embodiments, processor 1703 may first receive the encoded bitstream and then save the encoded video sequence to memory 1705 for later retrieval from memory.

The encoded bitstream may comprise a parameter set with a syntax indicator or a syntax indicator. At block 1820, processor 1703 may, in response to the value of the syntax indicator, decode the first coded sample information using a picture header syntax element. At block 1830, processor 1703 may, in response to the value of the syntax indicator, decode the second coded sample information using the picture header syntax element.

Figure 18:
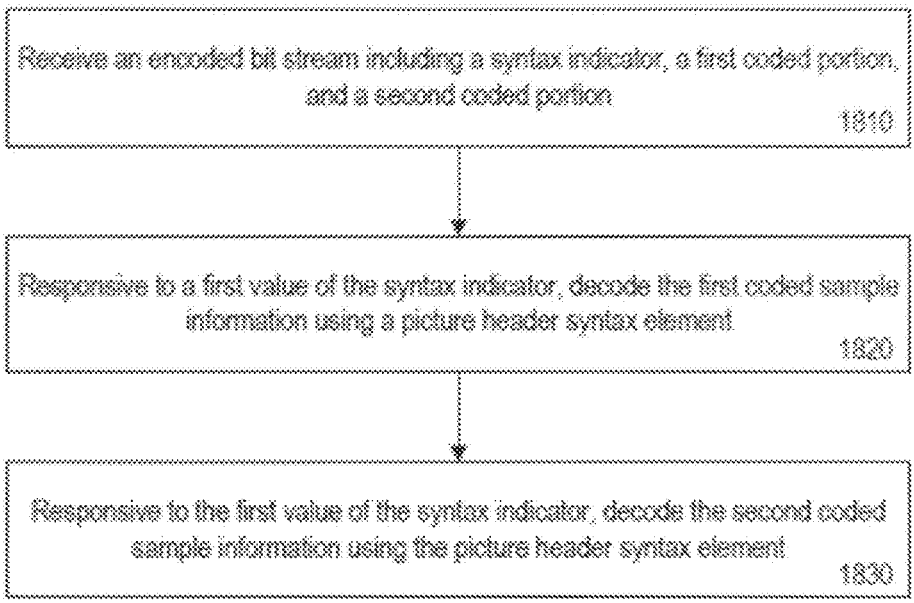
FIG. 18 is a flow chart of an example of a process for decoding a bitstream with an optional picture header according to some embodiments of inventive concepts.

Various operations of FIG. 18 may be optional with respect to some embodiments.

Operations of electronic device 1700 will now be discussed with reference to the flow chart of FIG. 19 according to some embodiments of inventive concepts. For example, modules (also referred to as units) may be stored in memory 1705 of FIG. 17, and these modules may provide instructions so that when the instructions of a module are executed by processor 1703, processor 1703 performs respective operations of the flow chart of FIG. 19.

At block 1910, processor 1703 may wait for an encoded bitstream to be provided. At block 1912, processor 1703 may receive an encoded bitstream. The processor 1703 may receive the encoded bitstream from a remote source over a network though communication interface 1701 and/or by retrieving the encoded bitstream from memory 1705. According to some embodiments, processor 1703 may first receive the encoded bitstream and then save the encoded video sequence to memory 1705 for later retrieval from memory. The encoded bitstream may comprise parameter set information comprising a syntax indicator or a syntax element that is indicative of at least two values. The encoded bitstream can further comprise a first coded portion comprising first coded sample information for a picture, and a second coded portion comprising second coded sample information for the picture.

In some embodiments, the parameter set information precedes the picture header in the encoded bitstream. The picture header may precede the first coded portion in the encoded bitstream and the first coded portion may precede the second coded portion in the encoded bitstream.

In some embodiments, the first coded portion comprises a first video coding layer ("VCL") network abstraction layer ("NAL") unit and the second coded portion comprises a second VCL NAL unit. In additional or alternative embodiments, the parameter set information is comprised in a sequence parameter set. In some embodiments, the syntax indicator is indicative of one of multiple values. In additional or alternative embodiments, the syntax indicator comprises a flag.

At block 1920, processor 1703 may detect a value of a syntax indicator in the encoded bitstream. Responsive to detecting a first value of the syntax indicator the processor 1703 may perform operations at block 1930.

At block 1930, processor 1703 may determine if a picture header is missing from the encoded bitstream. In response to detecting that the picture header is missing the processor 1703 may perform operations at block 1932.

At block 1932, processor 1703 can perform error handling. In some embodiments, processor 1703 can determine an error occurred based on the absence of the picture header. The processor 1703 may report the error over a communication network to a source of the encoded bitstream. The processor 1703 may perform error concealment for a decoded bitstream generated based on decoding the first coded sample information and the second coded sample information.

At block 1934, processor 1703 may decode the encoded bitstream using picture header syntax element 1934. In some embodiments, the first coded portion comprises first header information with a first coded portion syntax element and the second coded portion comprises second header information with a second coded portion syntax element. Decoding the first coded sample information may comprise decoding the first coded sample information using the picture header syntax element from the picture header and using the first coded portion syntax element. Decoding the second coded sample information may comprise decoding the second coded sample information using the picture header syntax element from the picture header and using the second coded portion syntax element.

At block 1936, processor 1703 may generate a decoded bitstream from the encoded bitstream. In some embodiments, processor 1703 may generate the decoded bitstream based on decoding the first coded sample information and based on decoding the second coded sample information. At block 1938, processor 1703 may render an image on a display (e.g., screen 1709) based on the decoded bitstream.

At block 1940, processor 1703 may determine whether the decoding of the encoded bitstream is completed. If the decoding of the encoded bitstream is not completed, processor 1703 may return to block 1930 to further decode the encoded bitstream. In some embodiments, the encoded bitstream is an encoded video bitstream. The picture is a first picture, the picture header is a first picture header, the picture header syntax elements is a first picture header syntax element. The encoded bitstream can further comprise a third coded portion comprising third coded sample information for a second picture and a fourth coded portion comprising fourth coded sample information for the second picture. In some embodiments, the second coded portion precedes the second picture header in the encoded bitstream and the second picture header precedes each of the third and fourth coded portions in the coded bitstream. In some embodiments, the first picture header syntax element can comprise first syntax information and the second picture header syntax element can comprise second syntax information different that the first syntax information. In some embodiments, processor 1703 may detect than an error has occurred based on failure to detect a second picture header associated with the second picture. During subsequent operations at blocks 1930, 1932, 1934, 1936, and 1938 the processor 1703 may decode the third and fourth coded portions and render the second picture.

If, at block 1940, the processor 1703 determines that the encoded bitstream has been decoded, the processor 1703 may return to block 1910 and wait for subsequent encoded bitstreams. In some embodiments, the encoded bitstream is a first encoded bitstream, the parameter set information is first parameter set information, the syntax indicator is a first syntax indicator, and the picture is a first picture. A second encoded bitstream can be received by processor 1703. The second encoded bitstream can comprise second parameter set information comprising a second syntax indicator having a second value different than the first value, a third coded portion comprising third coded sample information for a second picture, a fourth coded portion comprising fourth coded sample information for the second picture. The third coded portion can comprise third header information with a third coded portion syntax element and the fourth coded portion can comprise fourth header information with a fourth coded portion syntax element. Responsive to the second syntax indicator having the second value different than the first value, the processor 1703 can, at block 1954, decode the third coded sample information using the third coded portion syntax element. The processor 1703 can also, at block 1954, responsive to the second syntax indicator having the second value different than the first value, decode the fourth coded sample information using the fourth coded portion syntax element.

In some embodiments, the first value of the first syntax indicator indicates the presence of the first picture header for the first picture in the first encoded bitstream, and the second value of the second syntax indicator indicates the absence of a picture header for the second picture in the second encoded bitstream.

In additional or alternative embodiments, wherein the first value of the first syntax indicator indicates the presence of picture headers for all pictures in the first encoded bitstream, and wherein the second value of the second syntax indicator indicates the absence of a picture header for all pictures in the second encoded bitstream.

Responsive to detecting that the syntax indicator is a second value at block 1920, the processor may perform operations at block 1950. At block 1950, processor 1703 determines whether a picture header is detected. In response to detecting that the picture header is present in the encoded bitstream, the processor can perform operations at block 1952. At block 1952, processor 1703 can perform similar error handling as described in block 1932.

At block 1954, processor 1703 decodes the encoded bitstream using a syntax element comprised in the coded portion. At block 1956, processor 1703 may generate a decoded bitstream from the encoded bitstream. At block 1958, processor 1703 may render an image on a display (e.g., screen 1709) based on the decoded bitstream.

At block 1960, processor 1703 may determine whether the decoding of the encoded bitstream is completed. If the decoding of the encoded bitstream is not completed, processor 1703 may return to block 1950 to further decode the encoded bitstream. Otherwise, the processor 1703 may return to block 1910 and wait for subsequent encoded bitstreams.

In some embodiments, the encoded bitstream comprises a stream of bits for which the parameter set information is active. The parameter set information being active can comprise using the parameter set information to decode all coded sample information of respective coded portions of the stream of bits comprising the first and second coded portions. The first encoded bitstream can be a first portion of a stream of bits for which the first parameter set information is active and the second encoded bitstream can be a second portion of the stream of bits for which the second parameter set information is active. In additional or alternative embodiments, the first parameter set information being active can comprise using the first parameter set information to decode all coded sample information of respective coded portions of first portion of the stream of bits comprising the first and second coded portions. The second parameter set information being active can comprise using the second parameter set information to decode all coded sample information of respective coded portions of second portion of the stream of bits comprising the third and fourth coded portions.

Figure 19:
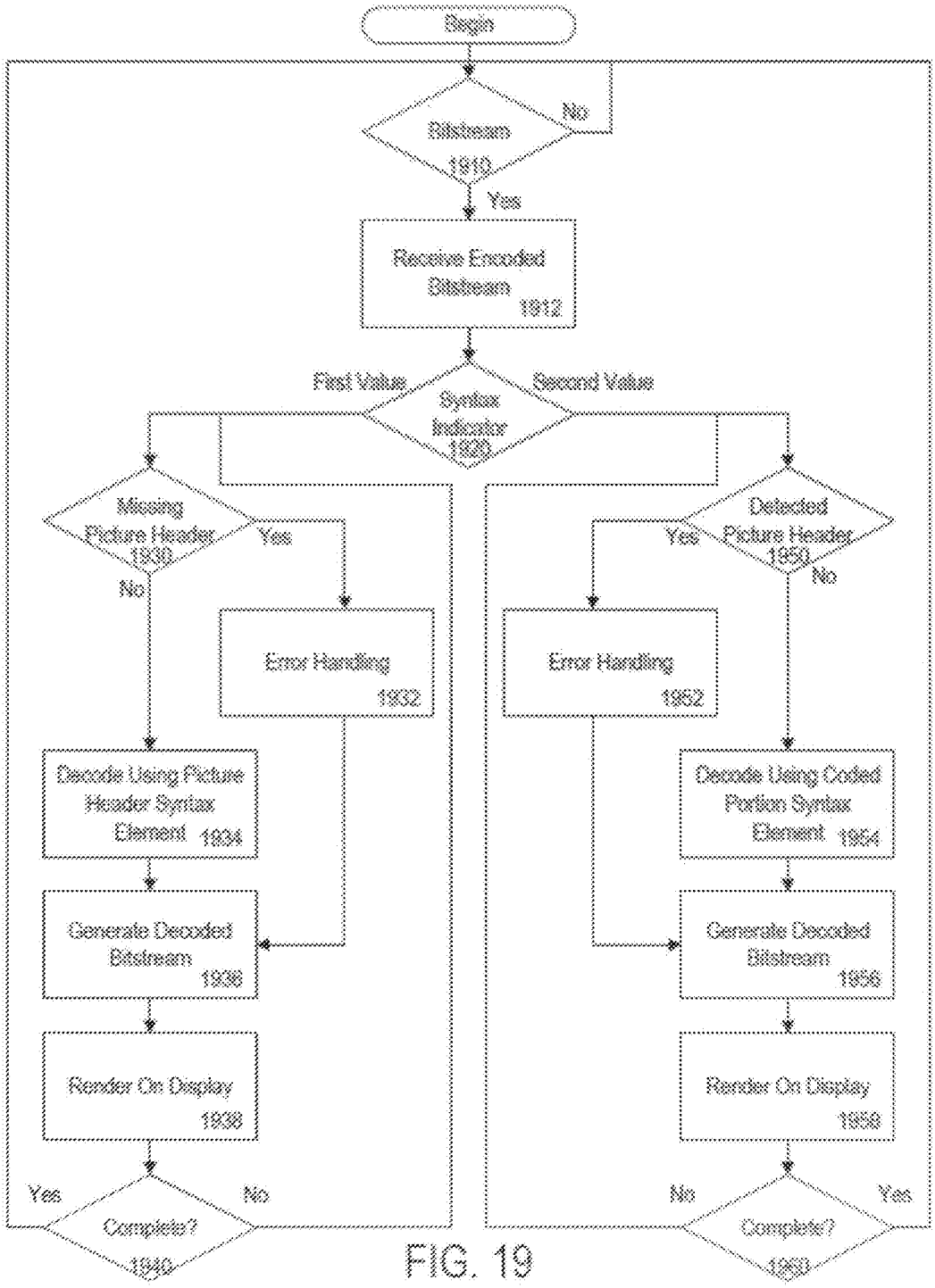
FIG. 19 is a flow chart of an example of a process for decoding a bitstream with an optional picture header according to some embodiments of inventive concepts.

Various operations of FIG. 19 may be optional with respect to some embodiments. In some embodiments, operations of blocks 1910, 1932, 1936, 1938, 1940, 1950, 1952, 1954, 1956, 1958, and 1960 of FIG. 19 may be optional.

In some embodiments, electronic device 1700 can generate encoded image by generating the encoded bitstream described in FIGS. 18-19.

The invention claimed is:

[1. A method of processing encoded image data, the method comprising:

receiving an encoded bitstream comprising parameter set information including a syntax indicator, a first slice comprising first coded sample information for a first picture, a second slice comprising second coded sample information for the first picture, a third slice comprising third coded sample information for a second picture and a fourth slice comprising fourth coded sample information for the second picture;

responsive to detecting a first value of the syntax indicator, decoding the first coded sample information using a picture header syntax element from a first picture header of the encoded video bitstream; and responsive to detecting the first value of the syntax indicator, decoding the second coded sample information using the picture header syntax element from the first picture header of the encoded video bitstream, responsive to detecting the first value of the syntax indicator detecting that as error has occurred based on failure on detecting a second picture header associated with the second picture, wherein the picture header is a NAL unit having a specific NAL unit type that indicates that the NAL unit contains picture header syntax elements.]

[2. The method of claim 1, wherein the parameter set information precedes the picture header in the encoded video bitstream, wherein the first picture header precedes the first slice in the encoded video bitstream, and wherein the first slice precedes the second slice in the encoded video bitstream.]

[3. The method of claim 1, wherein the first slice comprises first header information with a first syntax element, wherein the second slice comprises second header information with a second slice syntax element, wherein decoding the first coded sample information comprises decoding the first coded sample information using the picture header syntax element from the first picture header and using the first slice syntax element, and wherein decoding the second coded sample information comprises decoding the second coded sample information using the picture header syntax element from the first picture header 16 and using the second slice syntax element.]

[4. A computer program comprising program code to be executed by at least one processor of an electronic device, wherein execution of the program code causes the electronic device to perform a method according to claim 1.]

[5. An electronic device comprising:

processing circuitry; and memory coupled with the processing circuitry, wherein the memory includes instructions that when executed by the processing circuitry causes the electronic device to:

receive an encoded bitstream comprising parameter set information including a syntax indicator, a first slice comprising first coded sample information for a first picture, a second slice comprising second coded sample information for the first picture, a third slice comprising third coded sample information for a second picture and a fourth slice comprising fourth coded sample information for the second picture;

responsive to detecting a first value of the syntax indicator, decode the first coded sample information using a picture header syntax element from a first picture header of the encoded video bitstream; and responsive to detecting the first value of the syntax indicator, decode the second coded sample information using the picture header syntax element from the first picture header of the encoded video bitstream, responsive to detecting the first value of the syntax indicator, detect that as error has occurred based on failure on detecting a second picture header associated with the second picture, wherein the picture header is a NAL unit having a specific NAL unit type that indicates that the NAL unit contains picture header syntax elements.]

[6. The device of claim 5, wherein the parameter set information precedes the picture header in the encoded video bitstream, wherein the first picture header precedes the first slice in the encoded video bitstream, and wherein the first slice precedes the second slice in the encoded video bitstream.]

[7. The device of claim 5, wherein the first slice comprises first header information with a first syntax element, wherein the second slice comprises second header information with a second slice syntax element, wherein decoding the first coded sample information comprises decoding the first coded sample information using the picture header syntax element from the first picture header and using the first slice syntax element, and wherein decoding the second coded sample information comprises decoding the second coded sample information using the picture header syntax element from the first picture header 16 and using the second slice syntax element.]

[8. A computer program product comprising a non-transitory storage medium comprising program code to be executed by at least one processor of an electronic device, wherein execution of the program code causes the electronic device to:

receive an encoded bitstream comprising parameter set information including a syntax indicator, a first slice comprising first coded sample information for a first picture, a second slice comprising second coded sample information for the first picture, a third slice comprising third coded sample information for a second picture and a fourth slice comprising fourth coded sample information for the second picture;

responsive to detecting a first value of the syntax indicator, decode the first coded sample information using a picture header syntax element from a first picture header of the encoded video bitstream; and responsive to detecting the first value of the syntax indicator, decode the second coded sample information using the picture header syntax element from the first picture header of the encoded video bitstream, responsive to detecting the first value of the syntax indicator, detect that as error has occurred based on failure on detecting a second picture header associated with the second picture, wherein the picture header is a NAL unit having a specific NAL unit type that indicates that the NAL unit contains picture header syntax elements.]

[9. The computer program product of claim 8, wherein the parameter set information precedes the picture header in the encoded video bitstream, wherein the first picture header precedes the first slice in the encoded video bitstream, and wherein the first slice precedes the second slice in the encoded video bitstream.]

[10. The computer program product of claim 8, wherein the first slice comprises first header information with a first syntax element, wherein the second slice comprises second header information with a second slice syntax element, wherein decoding the first coded sample information comprises decoding the first coded sample information using the picture header syntax element from the first picture header and using the first slice syntax element, and wherein decoding the second coded sample information comprises decoding the second coded sample information using the picture header syntax element from the first picture header 16 and using the second slice syntax element.]

*11. A method of processing encoded image data, the method comprising:*

*receiving an encoded bitstream comprising a sequence parameter set including a flag, a first slice comprising first coded sample information for a first picture, a second slice comprising second coded sample information for the first picture, a third slice comprising third coded sample information for a second picture and a fourth slice comprising fourth coded sample information for the second picture; and*

*detecting that the flag has a first value, and in response:*

*decoding the first coded sample information using a picture header syntax element from a first picture header of the encoded bitstream;*

*decoding the second coded sample information using the picture header syntax element from the first picture header of the encoded bitstream; and*

*detecting that an error has occurred based on failure to detect a second picture header associated with the second picture;*

*wherein each of said first picture header and said second picture header is a Network Abstraction Layer (NAL) unit having a specific NAL unit type that indicates that the NAL unit contains picture header syntax elements.*

*12. The method of claim 11, wherein the sequence parameter set precedes the first picture header in the encoded bitstream, wherein the first picture header precedes the first slice in the encoded bitstream, and wherein the first slice precedes the second slice in the encoded bitstream.*

*13. The method of claim 11, wherein the first slice comprises first header information with a first slice syntax element, wherein the second slice comprises second header information with a second slice syntax element, wherein decoding the first coded sample information comprises decoding the first coded sample information using the picture header syntax element from the first picture header and using the first slice syntax element, and wherein decoding the second coded sample information comprises decoding the second coded sample information using the picture header syntax element from the first picture header and using the second slice syntax element.*

*14. An electronic device comprising:*

*processing circuitry; and*

*memory coupled with the processing circuitry, wherein the memory includes instructions that when executed by the processing circuitry causes the electronic device to:*

*receive an encoded bitstream comprising sequence parameter set including a flag, a first slice comprising first coded sample information for a first picture, a second slice comprising second coded sample information for the first picture, a third slice comprising third coded sample information for a second picture and a fourth slice comprising fourth coded sample information for the second picture; and*

*when the flag has a first value:*

*decode the first coded sample information using a picture header syntax element from a first picture header of the encoded bitstream;*

*decode the second coded sample information using the picture header syntax element from the first picture header of the encoded bitstream; and*

*detect that an error has occurred based on failure to detect a second picture header associated with the second picture;*

*wherein each of said first picture header and said second picture header is a Network Abstraction Layer (NAL)*

*unit having a specific NAL unit type that indicates that the NAL unit contains picture header syntax elements.*

*15. The device of claim 14, wherein the sequence parameter set precedes the first picture header in the encoded bitstream, wherein the first picture header precedes the first slice in the encoded bitstream, and wherein the first slice precedes the second slice in the encoded bitstream.*

*16. The device of claim 14, wherein the first slice comprises first header information with a first slice syntax element, wherein the second slice comprises second header information with a second slice syntax element, wherein decoding the first coded sample information comprises decoding the first coded sample information using the picture header syntax element from the first picture header and using the first slice syntax element, and wherein decoding the second coded sample information comprises decoding the second coded sample information using the picture header syntax element from the first picture header and using the second slice syntax element.*

*17. A computer program product comprising a non-transitory storage medium comprising program code to be executed by at least one processor of an electronic device, wherein execution of the program code causes the electronic device to:*

*receive an encoded bitstream comprising sequence parameter set including a flag, a first slice comprising first coded sample information for a first picture, a second slice comprising second coded sample information for the first picture, a third slice comprising third coded sample information for a second picture and a fourth slice comprising fourth coded sample information for the second picture; and*

*when the flag has a first value:*

*decode the first coded sample information using a picture header syntax element from a first picture header of the encoded bitstream;*

*decode the second coded sample information using the picture header syntax element from the first picture header of the encoded bitstream; and*

*detect that an error has occurred based on failure to detect a second picture header associated with the second picture;*

*wherein each of said first picture header and said second picture header is a Network Abstraction Layer (NAL) unit having a specific NAL unit type that indicates that the NAL unit contains picture header syntax elements.*

*18. The computer program product of claim 17, wherein the sequence parameter set precedes the first picture header in the encoded bitstream, wherein the first picture header precedes the first slice in the encoded bitstream, and wherein the first slice precedes the second slice in the encoded bitstream.*

*19. The computer program product of claim 17, wherein the first slice comprises first header information with a first slice syntax element, wherein the second slice comprises second header information with a second slice syntax element, wherein decoding the first coded sample information comprises decoding the first coded sample information using the picture header syntax element from the first picture header and using the first slice syntax element, and wherein decoding the second coded sample information comprises decoding the second coded sample information using the picture header syntax element from the first picture header and using the second slice syntax element.*

* * * * *